Patented Aug. 14, 1928.

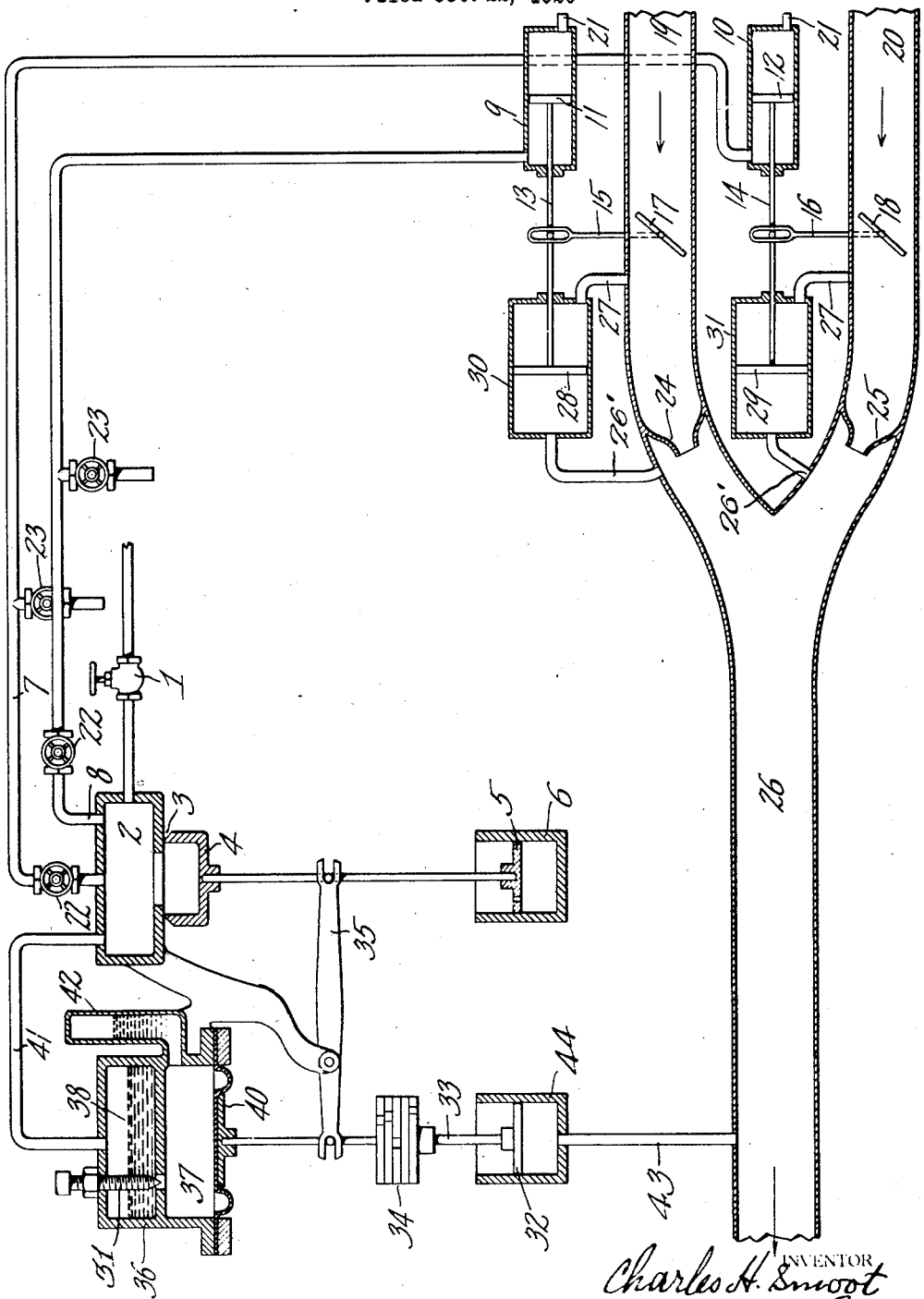

1,680,750

UNITED STATES PATENT OFFICE.

CHARLES H. SMOOT, OF MAPLEWOOD, NEW JERSEY.

REGULATOR.

Application filed October 22, 1926. Serial No. 143,414.

This invention relates to apparatus for the joint regulation of quantities and pressures of various constituents entering into a combined result.

In this class of regulators, it is desired to govern the supply of different constituents in such a way that the relative proportion in quantity of one constituent to another remains constant as in the supply of two fluid ingredients which are to be combined for a definite chemical result. To produce the chemical result, the relative quantities of the fluid must be always in a fixed proportion.

The object of this invention is to insure that the total amount of mixture of the various ingredients will be governed in addition to controlling the relative volumes according to a definite schedule.

The regulating apparatus which I have invented makes this possible. By means of a master controller sensitive to some function of the combination as for example the pressure in a mixing chamber, the said function, for example, the pressure, is maintained constant even though variable demands be made for the combination and at the same time the volume of the ingredients entering into the combination while varied as needed to maintain the pressure have, nevertheless, for all quantities entering into the combination, the relative volumes as fixed by proper adjustments so that whether a large amount or a small amount of ingredients are supplied, the resulting combination is kept the same. In order that the regulating apparatus may work with stability, that is, always supply without overtravel or undertravel, the proper amount of the ingredients, and at the same time maintain constant any selected function of the combination, I employ in connection with the master control a special device or compensator which reacts on the master controller and through it on the regulating system to restore the produced result always to a fixed value.

An application of the invention to the control of fluid mixtures is illustrated schematically in the accompanying drawing.

Referring to the drawing, a supply of fluid, preferably air under pressure, passes through a valve 1 into a master regulator pressure chamber 2, from which it escapes at 3 past the control valve 4, to which the piston 5 of a dashpot 6 is attached to prevent chattering.

The pressure in the chamber 2 exerts a downward effort on the unbalanced cup valve 4, which effort is in direct proportion to the pressure in chamber 2, having always a constant area on valve 4 opposed to this pressure. Pipes 7 and 8 lead from the chamber 2 to cylinders 9 and 10. These cylinders have pistons 11 and 12 which operate through piston rods 13 and 14, slotted crank arms 15 and 16, to which are attached butterfly valves 17 and 18 in conduits 19 and 20. The valves 17 and 18 act as volume regulators for fluids in their respective conduits. The cylinders 9 and 10 are open to the atmosphere as shown at 21 on the other side of the piston from where the pipes 7 and 8 are connected. The pipes 7 and 8 have needle valves or cocks 22 and 23, the former for restricting the flow to them from chamber 2 and the latter for bleeding the resultant pressure to the atmosphere. The flow of the fluids through the meter nozzles 24 and 25 that creates a pressure drop which by means of pipes 26' and 27, is made to act on pistons 28 and 29 in cylinders 30 and 31. These pistons 28 and 29 are respectively connected by the rods 13 and 14 to the pistons 11 and 12 so that the pressure drop through the nozzles 24 and 25 is made to oppose the actuating pressure from the master controller.

Actuating pressure from the master regulator passing through pipes 7 and 8 acts on one side of the pistons 11 and 12 which have atmospheric pressure on the other side. The fluids in conduits 19 and 20 pass through the butterfly valves 17 and 18 and thence through the flow meter nozzles 24 and 25 to enter mixing chamber 26, in consequence of which the butterfly valves take such a position that the pressure drop through the fluid meter nozzles is a fixed proportion of the master actuating pressure. This results in the quantities of fluid entering mixing chamber 26 always remaining in a fixed proportion to each other, as determined by the dimensions of the pistons, while the total quantities passing orifices 24 and 25 are determined by the actuating pressure, a rising actuating pressure giving greater volume through the orifices 24 and 25, and a falling pressure the reverse. At all times, however, the ratio between quantity passing orifice 24 to quantity passing orifice 25 remains constant.

The mixing chamber 26 is connected by pipe 43 to a regulating cylinder 44 having piston 32 with rod 33 carrying a weight 34.

A lever 35 interconnects the forces due to the weight 34, the upward pressure in cylinder 44 and the downward pressure on valve 4, in such a way that a drop in the pressure at 26 produces an increase in the actuating pressure in chamber 2 which results from a slight closing of the valve 4, which restricts the escape of the actuating fluid from the chamber 2 until this pressure builds up a sufficient amount to counterbalance the reduction of pressure in chamber 26.

This part of the equipment gives a definite increase in pressure at chamber 2 corresponding to a given drop in pressure at chamber 26, the relation between these being determined by areas and lever arm lengths. It constitutes, however, a complete regulating equipment, but with the characteristic that the pressure in mixing chamber 26 reduces as the quantity of mixture is removed from chamber 26, thus a lower pressure corresponds to a greater volume of inflow through the orifices 24 and 25. This characteristic of reducing pressure with increasing quantities is very beneficial in that it stabilizes the regulating system and prevents over-travel. The openings of the butterfly valves admitting fluid to the mixing chamber act progressively and take definite positions, opening and closing as the pressure in mixing chamber 26 falls or rises. It is in effect the same stabilizing action as is common in governors on steam engines or turbines found necessary for stability known as the speed characteristic or, the drop in speed corresponding to the increase in load.

It is often desirable, however, to maintain the pressure in chamber 26 absolutely constant on the average and the compensating device 36 is added to the master controller for this purpose.

It will be noted that the drop in pressure of mixing chamber 26 with increase of volumes flowing produces an increase in actuating pressure in chamber 2 exerting a downward effort on valve 4, which thus supplements the upward effort of pressure on piston 32.

The compensator 36, after a lapse of time following a change in condition, cancels the downward effort on valve 4, but because of its retarded action does not do so immediately, and thus leaves in the system the stabilizing effort of a momentary rise or fall in pressure of chamber 26 occurring on a rapid change of condition.

The compensator has a chamber 37 filled with viscous fluid, such as glycerine. A chamber 38 immediately above chamber 37 is partially filled with the same fluid and is connected to the chamber 37 by a passage controlled by the needle valve 39. A diaphragm 40 connected to the rod 33 closes the lower part of chamber 37 so as to be affected by the weight of the viscous fluid resting on it.

The actuating pressure in the master regulator is communicated by pipe 41 to the chamber 38. An air dome 42 is connected to the space above diaphragm 40.

The flow of viscous fluid is restricted by the needle valve 39 so that momentary changes of pressure at 2 do not produce any material flow of viscous fluid in the diaphragm chamber 37, the air dome 42 tending to absorb any minute flow of viscous fluid without a material change in pressure.

The air dome 42 also serves the purpose of permitting the lever system 35 to move freely, carrying with it diaphragm 40, without creating any material changes in pressure above diaphragm 40.

When after a change in requirements, the pressure in chamber 26 remains for an appreciable period of time either above or below normal, the pressure in chamber 2 is correspondingly below or above the pressure on top of diaphragm 40. This produces a slow flow of fluid passing through needle valve 39 until the pressure on top of diaphragm 40 is equal to the pressure under chamber 2.

The area of diaphragm 40 and its lever arm is such that a pressure above it equal to the pressure in chamber 2 completely neutralizes the pressure on valve 4, due also to the fluid pressure in 2. Thus subsequent to a change of condition and a lapse of time sufficient to equalize the pressure in 37 and 2, the pressure of mixing chamber 26 returns to its initial value or just sufficient to equalize the weight 34.

During a momentary change in the requirements, however, the pressure in chamber 2 will rise or fall, the pressure in 37 will remain constant, and greater or less volumes will be admitted to the mixing chamber 26, whose pressure will rise on decreasing volumes and fall on increasing volumes, thus giving stability to the system due to this characteristic, while after a lapse of time the pressure in 26 will be returned to its original constant value regardless of the volumes flowing by virtue of the cancellation of effort on valve 4 by the effort on diaphragm 40. The combination of the compensator with a master controller not only obviates the necessity of applying time delay mechanisms to the local controls, as has heretofore been done, but has the additional function of spreading through the whole regulating system a uniform correlated time delay and the further advantage of centralizing the adjustment thereof; for it will be apparent that in adjusting for example the needle valve 39 for a change in time delay the effect will be relayed to each and every control of the system without disturbing their relative values.

The piston 32 while shown as being directly operated on by the pressure in chamber 26 may equally well be made to respond to a derived result from said pressure. For example, if chamber 26 contains a mixture of air and gas supplying heat to a boiler, then steam pressure from the boiler would be the force to be used against the piston 32. In such a case the derived result or function, namely the steam pressure, could by the devices herein described, be held at any predetermined fixed amount. The term "produced fluid" is used broadly in my claims therefore to include not only a fluid derived from the physical mixture of two fluids but also such a derived result as steam pressure.

I claim:—

1. In a regulator, the combination with apparatus to be controlled for variable quantities with set requirements, a master controller adapted to respond to said requirements, local control means for regulating different elements of supply, separate means leading from the master controller to each of the local controls whereby the master controller causes the local controls to respond to the requirements according to set ratios, each local control being checked in its response to the set requirements by counteracting means responsive to the element being so controlled, and compensator mechanism connected to the master controller whereby the master controller upon each change of requirement makes a corresponding initial change in the setting of the several local controls to meet the change in requirement and after a prescribed time allows the said setting of the local controls to become normal for the new requirements.

2. In a regulator, the combination with apparatus to be controlled for variable quantities with set requirements, a master controller adapted to respond to said requirements, local control means for regulating different elements of supply, separate means separately adjustable leading from the master controller to each of the local controls whereby the master controller causes the local controls to respond to the reqirements according to set ratios as governed by their separate adjustments, each local control being checked in its reponse to the set requirements by counteracting means responsive to the element being so controlled, and compensator mechanism connected to the master controller whereby the master controller upon each change of requirement makes a corresponding initial change in the setting of the several local controls to meet the change in requirement and after a prescribed time allows the said setting of the local controls to become normal for the new requirements.

3. In a regulator, the combination comprising means responsive to the requirements, a loaded lever operated on by said means, a chamber adapted to hold fluid under pressure, local controls connected to said chamber and responsive to variation in the pressure of said chamber, each local control being checked in said responsiveness by the local effect produced thereby, a valve adapted to close an outlet from said chamber and connected to said lever so that the pressure of the fluid in the chamber against the valve will oppose the loading of said lever, a time delay device having two chambers connected by a restricted orifice and adapted to hold a liquid to act as an additional loading, one of the chambers having a communication with the fluid pressure chamber of the master controller and the other chamber having a movable member acted on by the pressure of the liquid and connected to the lever so that the weight of the liquid will be in opposition to the effect of the pressure against the valve to cancel out such effect after a given time delay.

4. A system of regulation for elements cooperatively contributing to the production of a fluid, comprising apparatus responsive to changes from a desired value in a function of the fluid produced to produce changes in a controlling force, means for causing the changes of such controlling force to react upon said apparatus in opposition to the force producing such changes, means to gradually counteract the opposing effect of such changes of controlling force, and regulators for individual elements contributing to the production of said fluid, each being responsive to variations in said controlling force.

5. A system of regulating for elements cooperatively contributing to the production of a fluid, comprising apparatus responsive to changes from a desired value in a function of the fluid produced to produce changes in a controlling force, means for causing the changes of such controlling force to react upon said apparatus in opposition to the force producing such changes, means to gradually counteract the opposing effect of such changes of controlling force, and regulators for individual elements contributing to the production of said fluid, each being responsive to variations in said controlling force and oppositely to variations in a force which is a function of the element controlled.

6. A system of regulation for elements cooperatively contributing to the production of a fluid, comprising apparatus responsive to changes from a desired value in the pressure of the fluid produced to produce changes in a controlling force, means for causing the changes of such controlling force to react upon said apparatus in opposition to the force producing such changes, means to gradually counteract the opposing effect of such changes of controlling force, and regulators for individual elements contributing to the production of said fluid, each being responsive to variations in said controlling force.

7. A system of regulation for elements cooperatively contributing to the production of a fluid, comprising apparatus responsive to changes from a desired value in the pressure of the fluid produced to produce changes in a controlling force, means for causing changes of such controlling force to react upon said apparatus in opposition to the force producing such changes, means to gradually counteract the opposing effect of such changes of controlling force, and regulators for individual elements contributing to the production of said fluid, each being responsive to variations in said controlling force and oppositely to variations in a force which is a function of the element controlled.

8. A system of regulation for elements cooperatively contributing to the production of a fluid, comprising apparatus responsive to changes in pressure of the fluid produced to vary the pressure of another fluid, means for causing changes of the controlled pressure to react upon said apparatus in opposition to the changes in the controlling pressure which produced them, means for gradually counteracting said opposition, regulators for individual elements contributing to the production of said fluid, means for causing said regulators to operate responsively to changes in said controlled pressure, and means for causing the changes produced by said regulators to act upon the regulators in opposition to the changes of controlled pressure.

9. A system of regulation for regulating the flow of a fluid contributing to the production of another fluid, comprising apparatus responsive to changes in pressure of the produced fluid to vary the pressure of a regulating fluid, means for causing changes in pressure of the regulating fluid to act upon said apparatus in opposition to the changes in the pressure of the produced fluid which produced them, means for gradually counteracting said opposition, and a regulator for said contributing fluid, responsive in its operation to changes in the pressure of said regulating fluid and of changes in a force produced by changing of flows of said contributing fluid.

CHARLES H. SMOOT.